Sept. 30, 1941.　　　　I. R. SPAHR　　　　2,257,657
TIRE CHAIN TOOL
Filed April 11, 1940
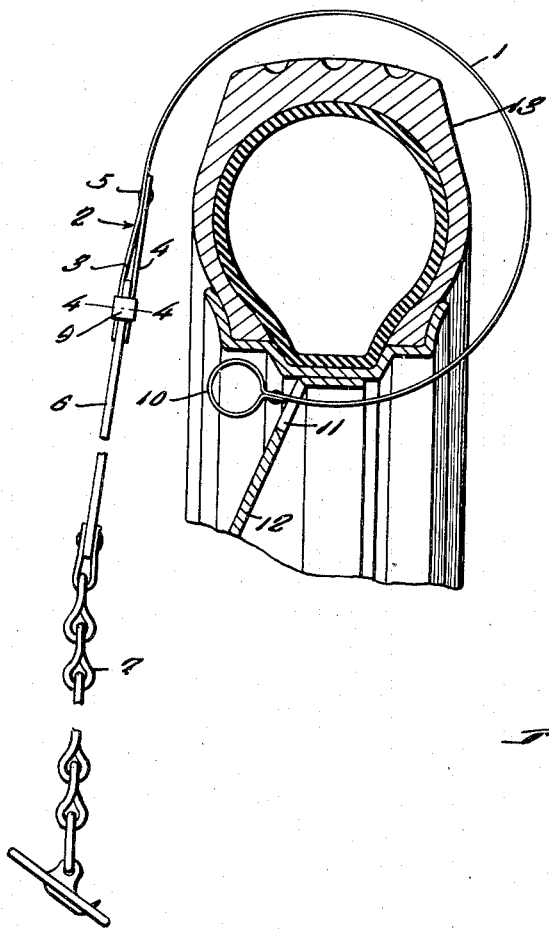
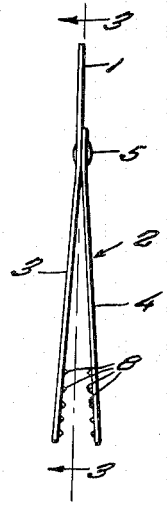
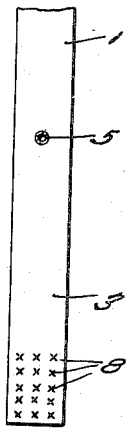
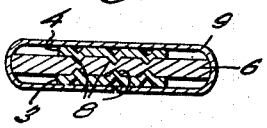
Inventor
Irwin R. Spahr
By Clarence A. O'Brien
Attorney Patented Sept. 30, 1941

2,257,657

UNITED STATES PATENT OFFICE 2,257,657

TIRE CHAIN TOOL

Irwin R. Spahr, St. Louis, Mo.

Application April 11, 1940, Serial No. 329,175

1 Claim. (Cl. 81—15.8)

The present invention relates to new and useful improvements in tire chain tools and has for its primary object to provide, in a manner as hereinafter set forth, a device of this character through the medium of which the application of skid chains to a tire, particularly those of the so-called emergency type, will be greatly simplified and expedited.

Another very important object of the invention is to provide a tire chain tool of the aforementioned character embodying novel means for firmly securing thereto the usual strap of the chain.

Other objects of the invention are to provide a tire chain tool of the character described which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a cross sectional view through a tire and a portion of a wheel, illustrating the manner of using a tool constructed in accordance with the present invention.

Figure 2 is a detail view in elevation of the clamp portion of the device.

Figure 3 is a vertical sectional view through the clamp, taken substantially on the line 3—3 of Fig. 2.

Figure 4 is a view in horizontal section, taken substantially on the line 4—4 of Fig. 1.

Referring now to the drawing in detail, it will be seen that the embodiment of the invention which has been illustrated comprises a resilient metal strip 1 of strap metal. On one end of the metal strip 1 is a clamp which is designated generally by the reference numeral 2. The clamp 2 comprises a jaw 3 formed as an integral part of the strip 1. Coacting with the jaw 3 is a resilient jaw 4 which is riveted at 5 to the strip 1.

The jaws 3 and 4 are adapted to receive therebetween the free end portion of the usual strap 6 of a skid chain 7. Teeth or prongs 8 are pressed inwardly on the free end portions of the jaws 3 and 4 for biting into the strap 6.

The jaws 3 and 4 are closed and secured on the strap 6 through the medium of a transversely elongated slide 9 of suitable metal. Referring to Fig. 4 of the drawing, it will be observed that the jaws 3 and 4 are of less width than the strap 6 and, further, that the slide 9 is long enough to be slipped on the free end portion of said strap 6 which is secured between said jaws 3 and 4. Thus, the strap 6 is positively retained against lateral movement in the clamp 2.

At its other end, the metal strip 1 is provided with means 10 for pulling said strip. This means 10 for pulling the metal strip 1 is of such size that it will not pass through the opening 11 in the wheel 12. The reference numeral 13 designates a pneumatic tire on the wheel 12.

It is thought that the manner in which the device is used will be readily apparent from a consideration of the foregoing. Briefly, the resilient strip 1, with the clamp 2 forward, is inserted through the opening 11 in the wheel 12. As the strip 1 is thus threaded through the opening 11 the clamp 2 passes upwardly and then back across the tire 13 where the strap 6 may be conveniently attached. The ring 10 prevents the device from passing all the way through the opening 11 in the wheel 12. The free end portion of the strap 6 is inserted in the clamp 2 and the elongated slide 9 is slipped downwardly thereover in a manner to close and secure the jaws 3 and 4 on said strap. Then, through the medium of the ring 10, the strip 1 is pulled back through the opening 11 for pulling the strap 6 therethrough. The device makes for quick application of the chain and renders it unnecessary for a person to lie on the floor or ground thereby soiling the clothes.

It is believed that the many advantages of a tire chain tool constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A tire chain tool comprising a resilient metal strip, and a clamp on one end of the metal strip for detachably connecting the strap of a skid chain thereto, said clamp including a pair of resilient jaws for the reception of the strap therebetween, the width of said jaws being less than that of the strap, and a transversely elongated slide operable on the jaws for closing said jaws, said slide being of a substantially greater width than the jaws and engageable over the strap for securing said strap against lateral movement between the jaws.

IRWIN R. SPAHR.